United States Patent
Mayr

(10) Patent No.: US 12,272,804 B2
(45) Date of Patent: Apr. 8, 2025

(54) CONTROL OF AN ELECTRIC TOOL AND A SEPARATE LIGHTING DEVICE

(71) Applicant: Einhell Germany AG, Landau/Isar (DE)

(72) Inventor: Stefan Mayr, Landau/Isar (DE)

(73) Assignee: EINHELL GERMANY AG, Landau/Isar (DE)

( * ) Notice: Subject to any disclaimer, the term of this patent is extended or adjusted under 35 U.S.C. 154(b) by 104 days.

(21) Appl. No.: 18/315,308

(22) Filed: May 10, 2023

(65) Prior Publication Data

US 2023/0369666 A1    Nov. 16, 2023

(30) Foreign Application Priority Data

May 13, 2022 (DE) ...................... 10 2022 112 034.1

(51) Int. Cl.
*H01M 10/48* (2006.01)
*B25F 5/00* (2006.01)
*H01M 10/42* (2006.01)

(52) U.S. Cl.
CPC ............. *H01M 10/488* (2013.01); *B25F 5/00* (2013.01); *H01M 2010/4271* (2013.01)

(58) Field of Classification Search
CPC ........ H01M 10/488; H01M 2010/4271; B25F 5/00
USPC ...................................................... 340/636.1
See application file for complete search history.

(56) References Cited

U.S. PATENT DOCUMENTS

| | | | | |
|---|---|---|---|---|
| 2016/0325391 | A1* | 11/2016 | Stampfl | .................. H04W 4/80 |
| 2016/0342151 | A1* | 11/2016 | Dey, IV | ............. G06F 3/04842 |
| 2017/0127501 | A1* | 5/2017 | Isaacs | .................. H05B 47/196 |
| 2017/0173768 | A1* | 6/2017 | Dey, IV | .................. B25B 21/02 |

(Continued)

FOREIGN PATENT DOCUMENTS

| | | | |
|---|---|---|---|
| DE | 102017211114 | * | 6/2017 |
| DE | 10 2016 113579 A1 | | 1/2018 |
| DE | 10 2017 211 114 A1 | | 1/2019 |

(Continued)

OTHER PUBLICATIONS

Office Action issued Jan. 17, 2023 in DE Appl. No. 10 2022 112 034.1.

(Continued)

*Primary Examiner* — Omar Casillashernandez
(74) *Attorney, Agent, or Firm* — MEDLER FERRO WOODHOUSE & MILLS PLLC

(57) ABSTRACT

A control system is disclosed for an electric tool and a lighting device. The control system includes a first control circuit and a sensor for the electric tool and a second control circuit for the lighting device. The sensor is configured to generate a sensor signal depending on a value of an operating parameter of the electric tool. The first control circuit is configured to transmit information relating the operating parameter value to the second control circuit depending on the sensor signal. The second control circuit is configured to control a light source of the lighting device depending on the transmitted information to emit one or more light pulses, wherein a pulse parameter relating to a pulse duration, a pulse amplitude, a frequency, and/or a duty cycle of the light pulses, and/or emitted light intensity, depends on the operating parameter value.

14 Claims, 1 Drawing Sheet

(56) References Cited

U.S. PATENT DOCUMENTS

2022/0009064 A1 * 1/2022 Puzio ...................... B25B 21/02

FOREIGN PATENT DOCUMENTS

| DE | 3950230 | * | 7/2021 |
| EP | 3 950 230 A1 | | 2/2022 |
| WO | WO2017075547 | * | 10/2016 |
| WO | 2017075547 A1 | | 5/2017 |

OTHER PUBLICATIONS

European Search Report issued Oct. 5, 2023 in EP Appl. No. 23 172 707.4.

* cited by examiner

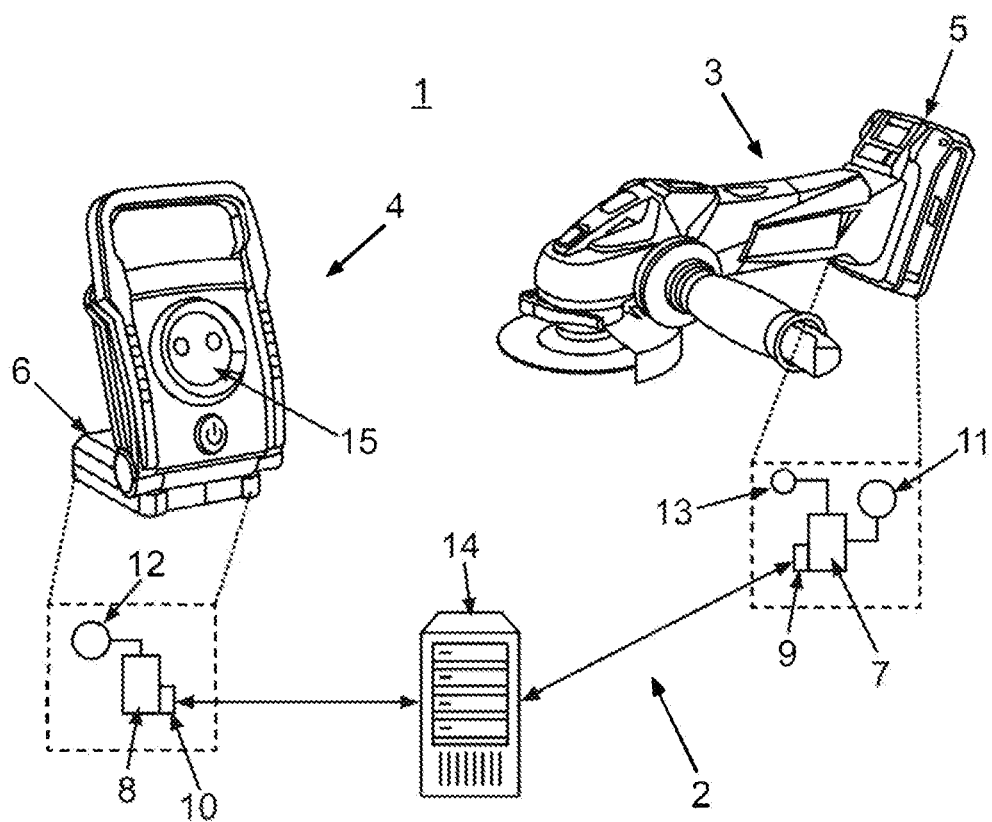

CONTROL OF AN ELECTRIC TOOL AND A SEPARATE LIGHTING DEVICE

FIELD

The present invention relates to a control system for an electric tool and a lighting device arranged separately from the electric tool, to an electric tool system comprising such a control system as well as to a method for operating an electric tool system.

BACKGROUND

In electric tools, in particular electric tools for cutting, grinding or drilling, a severe load or overload of the electrical load of the electric tool, in particular of an electric motor of the electric tool, and/or a severe load or overload of the electronics can occur if a very high resistance is opposed to the electrical load by the workpiece to be processed. In battery-operated electric tools, such an overload can also result in a damage of battery cells. This can in particular be relevant if a user himself provides a feed of the electric tool with respect to the workpiece or such a manual feed is at least partially provided, such as for instance in portable circular saws, angle grinders, drilling machines or other electric tools for cutting, grinding or drilling. In addition, it can be possible, in particular if the electric appliance is operable with a battery pack, for example exchangeable battery pack, that a maximum current output of the battery pack is higher than a current maximally admissible or tolerable for the electrical load, such that the electrical load could be damaged in case of doubt.

It is known to monitor the current consumption and/or temperature of the electrical load of an electric tool and to optionally switch off the electric tool if the current consumption and/or temperature exceed a respectively admissible limit value. However, this is disadvantageous with respect to the user comfort on the one hand since the user is interrupted in his work. Moreover, the interruption of the operation of the electric tool optionally may result in quality losses in processing the workpiece, in particular if blades are stopped. In addition, the admissible limit value for the current has to be designed relatively conservative in such an approach. A disadvantage of the switch-off depending on temperature can be that it can take relatively long until the electrical load is sufficiently cooled down.

SUMMARY

It is an object of the present invention to specify a possibility of protection of the electric tool or its components from overload, by which a forced switch-off of the electric tool is avoided, if possible.

This object is solved by the respective subject matter of the independent claims. Advantageous developments and preferred embodiments are the subject matter of the dependent claims.

The invention is based on the idea to couple the electric tool to a lighting device, which is arranged separately from the electric tool, such that light or light pulses are output by means of the lighting device depending on a sensorially determined value of an operating parameter of the electric tool to warn or inform the user when the corresponding value of the operating parameter suggests it.

According to an aspect of the invention, a control system for an electric tool system, the electric tool system comprising an electric tool and a lighting device arranged separately from the electric tool, is specified. The control system comprises a first control circuit for the electric tool and a second control circuit for the lighting device. The control system comprises a sensor for the electric tool, which is correspondingly arranged and configured to generate a sensor signal depending on a value of an operating parameter of the electric tool, in particular to determine or measure the value of the operating parameter and to generate the sensor signal depending thereon. The first control circuit is connected to the sensor in wireless or wired manner and configured to obtain the sensor signal from the sensor and to directly or indirectly transmit information relating to the value of the operating parameter to the second control circuit, in particular to wirelessly communicate it, depending on the sensor signal.

In a first alternative, the second control circuit is configured to obtain the information signal and to control a light source of the lighting device depending on the transmitted information to generate and emit a plurality of light pulses. Therein, a pulse parameter relating to a pulse duration of the plurality of light pulses and/or to a pulse amplitude of the plurality of light pulses and/or to a frequency of the plurality of light pulses and/or to a duty cycle of the plurality of light pulses depends on the value of the operating parameter. In a second alternative, the second control circuit is configured to obtain the information signal and to control the light source depending on the transmitted information to emit a light pulse, wherein a pulse parameter relating to a pulse duration and/or to a pulse amplitude of the light pulse depends on the value of the operating parameter. In a third alternative, the second control circuit is configured to obtain the information signal and to control the light source depending on the transmitted information to emit light, wherein a light intensity of the emitted light depends on the value of the operating parameter.

That the pulse parameter relates to the pulse duration, the pulse amplitude, the frequency and/or the duty cycle, can be understood such that the pulse parameter is equal to the pulse duration, the frequency or the duty cycle or corresponds to a quantity derived therefrom.

The plurality of light pulses is for example a sequence of light pulses separated from each other and in particular separately perceivable by a human observer, which are for example periodically emitted with a corresponding period. Two adjacent consecutive light pulses are in particular by an off-time, whereas the individual light pulses are emitted during a corresponding on-time. If each period contains exactly one light pulse, thus, the period results from the sum of the on-time and the off-time. The pulse duration of the plurality of light pulses can for example correspond to the duration of the on-time. The frequency of the plurality of light pulses can correspond to the inverse period. The duty cycle of the plurality of light pulses can for example correspond to a ratio of the pulse duration to the period, thus to a quotient of the pulse duration and the period or, in other words, to a product from the pulse duration and the frequency. However, other, in particular equivalent, quantities can also be used as the pulse parameter, for example a ratio of on-time to off-time or the like. Such a ratio would not be identical to the duty cycle as defined above, but relates to the duty cycle.

In particular, the light pulses are perceivable separately from each other for a user or observer. Accordingly, the frequency of the plurality of light pulses is not arbitrarily high, since the light pulses could not be separately perceivable any more at very high frequencies. For example, the frequency can be less than 50 Hz, preferably less than or equal to 10 Hz. For example, the frequency can be greater than or equal to 0.1 Hz, preferably greater than or equal to 1 Hz. For example, the frequency can be in the range of 1 Hz to 5 Hz.

Independently of the pulse parameter, in particular the frequency or the duty cycle of the plurality of light pulses, the light source can for example be controlled according to a pulse width modulation by the second control circuit, to control or regulate the brightness of the emitted light pulses. However, pulses associated therewith are not to be understood by the plurality of light pulses since they would optionally not be perceivable for a human observer as separated light pulses and would be present in frequency ranges other than the mentioned ones.

For example, the light intensity can be controlled depending on the value of the operating parameter by means of pulse width modulation.

For example, the operating parameter can correspond to an operating current of the electrical load, for example to a current, which an energy source, in particular a battery pack, outputs to the electrical load, in particular to the electric motor, during the operation of the electric tool. According to design of the electric tool and of the load, however, other operating parameters can also be used, such as for instance an operating voltage, for example an output voltage of the battery pack, a state of charge of the battery pack, a temperature, for example a temperature of an electronic component of the electric tool or of the electrical load, a fluid flow of an operating agent, thus in particular a fluid flowrate or a fluid flow speed, or a combination of the mentioned quantities, for instance a product of fluid pressure and fluid flow speed, an electrical power or the like. The operating parameter can also be a derived quantity, for instance a torque, which can for example be derived from signatures, which occur in the operating current or the output voltage, so-called ripples.

The communication between the electric tool, in particular the first control circuit, and the lighting device, in particular the second control circuit, can in general be effected in wireless or wired manner. Preferably, the communication is effected wirelessly, for example via radio. In particular, the control system can comprise a first communication interface for the electric tool connected to the first control circuit and a second communication interface for the lighting device connected to the second control circuit.

The transmission of the information can then be directly or indirectly effected from the first communication interface to the second communication interface. Therein, by a direct transmission, it can be understood that a radio signal or a wired signal is generated by means of the first communication interface and it directly transmits it to the second communication interface and thereby to the second control circuit without interposition of a further place. By an indirect communication or an indirect transfer or transmission of the information, it can be understood that the signal is first transmitted to a further place, for example an external computing unit, by means of the communication interface and then is transmitted from it to the second communication interface and thus the second control circuit.

In particular, the signals used in transmitting the information for transmitting the information can also be processed or changed, but the information is retained therein.

The wireless transmission of the information from the first control circuit or the first communication interface to the second control circuit or the second communication interface can for example be realized according to a GSM standard, a standard based on the GSM standard, Edge, UMTS, HSDPA, LTE or another mobile radio standard. The transmission can for example also be effected based on LTE-M, LTE-CAT-M1 or another standard. The transmission can also be effected according to a Narrowband Internet of Things standard, NB-IOT, or another low-power wide area network, LPWAN. The transmission can also be effected according to another radio standard, for instance according to Bluetooth or WLAN.

The lighting device includes one or more lighting units, wherein a lighting unit is for example given by a lamp. If the lighting device includes two or more lighting units, they can for example be individually controllable independently of each other or be jointly controllable. The lighting units can be spatially distributed or arranged at a common location, for example mechanically coupled to a unit. In various embodiments, the lighting device can in particular be composed of one lighting unit. The lighting system is in particular not part of the electric tool and the electric tool is not part of the lighting system. In particular, the electric tool is not physically connected to the lighting system.

For example, the electric tool can comprise at least one battery pack, which is adapted and configured to supply the electrical load, in particular the electric motor, of the electric tool with energy. The first control circuit can then be a part of the at least one battery pack or be arranged in another part of the electric tool. It is also possible that only a part of the first control circuit is included by the battery pack and a further part of the control circuit is included in the other part of the electric tool.

The battery pack can be detachably, in particular non-destructively detachably, connected to a housing of the electric tool, for example via a locking connection, a plug connection and/or a clamping connection. In particular, the mechanical connection of the battery pack to the housing of the electric tool can be configured as a form-fit and/or force-fit connection without a firmly bonded connection being present. In other words, the mechanical connection of the battery pack to the housing of the electric tool can be detached without a firmly bonded connection having to be detached. Preferably, the mechanical connection can be manually detached without the employment of other tools as intended. In other words, the battery pack is configured as an exchangeable battery pack, in particular system battery pack. For electrical and mechanical connection, the housings of the battery pack and of the electric tool can comprise respective interfaces.

An electrical connection of the at least one battery cell to the electric tool, in particular the electrical load, can for example be effected via one or more detachable electrical contacts, for example clamping contacts or plug contacts, in particular so-called tulip contacts or blade contacts. For example, plugs or sockets or receptacles or the like each compatible with each other can be provided at the interfaces of the corresponding housings to achieve the electrical connection of the battery pack to the electric tool.

This analogously also applies to the lighting device, in particular the light source, which can also be supplied with energy by at least one battery pack. Here too, the second control circuit can be included by the corresponding battery pack of the lighting device or be partially included or by another component of the lighting device.

By the control system according to the invention, a user of the electric tool, who is in the environment of the lighting device, can be immediately made aware of the value of the operating parameter, for example in proportion to one or more limit values, or be correspondingly informed or warned based on the emitted light pulse or the emitted light pulses or the light intensity depending on the value of the operating parameter.

Therein, the invention advantageously exploits the visual information channel since it cannot be masked or superimposed by inherent noises of the electric tool or noises by the interaction with the workpiece or by corresponding vibrations of the tool as it would be the case for acoustic feedbacks and haptic feedbacks, respectively, about the electric tool. Therein, it is further exploited that a dynamic appeal of the human perception is achieved by the generation of light pulses or light with variable light intensity, which can be specifically modified by the corresponding pulse parameter, such that changes can be immediately indicated. Thus, the light intensity, the frequency, the pulse duration or the duty cycle can for example be dynamically changed, depending on how great the value of the operating parameter with respect to one or more predetermined limit values is. In this manner, a relatively high information density can be provided to the user with a simple visual communication channel, which he can intuitively capture and optionally respond thereto.

Therein, it is in particular advantageous to employ the lighting device arranged separately from the electric tool, in particular a construction flood lamp or another room or ambient lighting, since the entire working environment of the user can be specifically influenced in this manner. Therefore, the user perceives the light pulses or the light even if he does not concentrate his attention immediately on the light source or the like. This offers corresponding advantages with respect to the reliability of the warning or information of the user, in particular compared to displays, warning lamps or the like, which would be directly arranged on the electric tool.

By the visual information or the visual warning based on the light pulses or the light, a switch-off of the electric tool can ideally be omitted if the value of the operating parameter approaches a critical value, since the situation and the value of the operating parameter can be correspondingly early and preferably dynamically indicated. In other words, the invention realizes a proactive strategy for avoiding critical states in contrast to a reactive strategy for instance by consequent switch-off of the current supply or limitation of the current supply.

Thus, not only the user comfort in using the electric tool can be improved, but quality losses in the working results can also be avoided since the tool is not stopped in the meantime as much as possible and has to start again, which can result in non-optimum transitions on the workpiece surface and so on, according to the type of the electric tool. Compared to a switch-off depending on temperature, a forced cooling pause of the electrical load can be avoided.

In addition to the control of the lighting device according to the invention depending on the transmitted information, a switch-off of the electrical load depending on current and/or depending on temperature can nevertheless be provided in some embodiments, for example if the user does not or not sufficiently respond to the control of the lighting device.

In addition, the electrical load is also reliably protected since reaching the critical state can be avoided as much possible. In particular, an overload of the electric motor by too high resistance due to too high feed by the user can be avoided as well as an overload of the battery cells in case of a battery-operated electric tool and/or of the electronics of the battery pack and of the electric tool, respectively.

The electric tool, which can also be a garden tool, is for example an electric tool for sawing, for cutting or for drilling. Thus, it can for example be a saw, for instance a jigsaw, a chop saw, a bench saw, a portable circular saw, a chain saw, a branch cutter, a band saw and so on. It can also be a milling machine, an angle grinder, a stone cutter, a tile cutter, a plane, a planer, a lathe and so on. Moreover, it can be a drilling machine, an impact drilling machine, a drill hammer and so on. This listing is only exemplary and not to be understood as exhaustive and does not basically restrict the applicability of the invention.

Particularly in electric tools for cutting, grinding or drilling, however, an at least partially manual feed by a user is usually to be performed. In other words, the user optionally has immediate influence on the load of the electric tool, in particular of an electrical load, for example an electric motor, by influencing the feed. In extreme case, the user can for example even provoke a standstill of the electric motor by corresponding action on the electric tool. Particularly in such electric tools, the invention can therefore be advantageously employed.

According to at least one embodiment of the control system, the first control circuit is configured to directly transmit the information to the second control circuit via the first communication interface and the second communication interface.

In alternative embodiments, the control system comprises an external computing unit and the first control circuit is configured to transmit the information to the first computing unit via the first communication interface, and the external computing unit is configured to transmit the information to the second control circuit via the second communication interface, in particular to indirectly transmit the information from the first control circuit to the second control circuit.

The external computing unit is neither part of the electric tool nor of the lighting device, thus is arranged externally both to the electric tool and to the lighting device. The external computing unit can for example be a computing unit of a server computer system or a cloud computer system or the like.

According to at least one embodiment, the sensor is configured as a current sensor and configured to generate the sensor signal depending on an operating current for the operation of the electrical load, in particular of the electric motor, of the electric tool.

In a battery-operated electric tool, the operating current can for example be a current, which is suppled from the battery pack to the electrical load.

According to at least one embodiment, the control system comprises a first battery pack for the energy supply of the electric tool, in particular of the electrical load, for example of the electric motor, wherein the first battery pack includes the first control unit and in particular the first communication interface.

Alternatively or additionally, the control system comprises a second battery pack for the energy supply of the lighting device, in particular of the light source, wherein the second battery pack includes the second control unit and in particular the second communication interface.

According to at least one embodiment, the first circuit is configured to generate the information such that the information relating to the value of the operating parameter includes the value of the operating parameter. The second control circuit is configured to determine the pulse parameter and/or the light intensity depending on the value of the operating parameter and to generate and to emit the plurality of light pulses according to the thus determined pulse parameter or to generate and emit the light according to the thus determined light intensity.

According to at least one embodiment, the second control circuit is configured to compare the value of the operating parameter to at least one predetermined limit value and to determine the pulse parameter and/or the light intensity depending on a result of the comparison and to generate and emit the plurality of light pulses according to the thus determined pulse parameter or to generate and emit the light according to the thus determined light intensity.

According to at least one embodiment, the first control circuit is configured to compare the value of the operating parameter to the at least one predetermined limit value and to generate the information such that the information relating to the value of the operating parameter includes a result of the comparison. The result of the comparison necessarily relates to the value of the operating parameter. The second control circuit is configured to determine the pulse parameter and/or the light intensity depending on the result of the comparison and to emit the plurality of light pulses according to the thus determined pulse parameter or to generate and emit the light according to the thus determined light intensity.

For example, a first limit value of the at least one limit value can define an admissible operating range. For example, the admissible operating range can correspond to a value of the operating parameter less than or equal to the first limit value. In this case, the pulse parameter can for example be determined such that the frequency of the plurality of light pulses is the higher the smaller the distance of the value of the operating parameter from the first limit value is. Alternatively or additionally, the light intensity can for example be the lower the smaller the distance of the value of the operating parameter from the first limit value is. Therein, the variation of the frequency and/or the light intensity can be effected continuously or in discrete steps, in particular in two or more discrete steps. Analogously, the duty cycle can also be dynamically changed, the closer the value of the operating parameter comes to the first limit value.

A further first limit value can also be predetermined, wherein the first limit value and the further first limit value define two or more admissible operating ranges. For example, a first admissible operating range can be present if the value of the operating parameter is less than or equal to the further first limit value and a second admissible operating range can be given if the value of the operating parameter is greater than the further first limit value, but less than or equal to the first limit value, which is greater than the further first limit value in this case. If the value of the operating parameter is less than or equal to the further first limit value, thus, the pulse parameter can correspond to a first pulse parameter, and if the value of the operating parameter is less than or equal to the first limit value and greater than the further first limit value, thus, the pulse parameter can correspond to a second pulse parameter value. The first value of the pulse parameter can correspond to a first frequency and the second value of the pulse parameter can correspond to a second frequency, which is greater than the first frequency or the like. Alternatively or additionally, if the value of the operating parameter is less than or equal to the further first limit value, the light intensity can correspond to a first intensity value, and if the value of the operating parameter is less than or equal to the first limit value and greater than the further first limit value, the light intensity can correspond to a second intensity value, which is for example less than the first intensity value.

However, a second limit value can also be provided, which defines an inadmissible operating range. If the value of the operating parameter is for example greater than or equal to the second limit value, thus, the inadmissible operating range can be given. In this case, the pulse parameter can for example also be determined depending on a difference between the second limit value and the value of the operating parameter, if the value of the operating parameter is greater than the second limit value. For example, the frequency of the plurality of light pulses can be the higher the more the value of the operating parameter diverges from the second limit value. Alternatively or additionally, the light intensity can be determined depending on the difference between the second limit value and the value of the operating parameter if the value of the operating parameter is greater than the second limit value. For example, the light intensity can be the lower the more the value of the operating parameter diverges from the second limit value.

According to at least one embodiment, the first control circuit is configured to determine the pulse parameter and/or the light intensity depending on the value for the operating parameter and to generate the information such that the information relating to the value of the operating parameter includes the pulse parameter and/or the light intensity, and the second control circuit is configured to control the light source according to the pulse parameter and/or the light intensity.

According to a further aspect of the invention, an electric tool system comprising an electric tool, a lighting device arranged separately from the electric tool and a control system according to the invention is specified. Therein, the electric tool in particular includes the first control circuit and the sensor as well as optionally the first communication interface. The lighting device includes the second control circuit, the light source and optionally the second communication interface.

According to at least one embodiment of the electric tool system, the lighting device is configured as a lighting device for room lighting or for exterior lighting.

Thus, the lighting device can in particular be configured as a construction flood lamp, flashlight, floor lamp, desk lamp, ceiling lamp, floodlight or the like.

According to at least one embodiment of the electric tool system, the electric tool is configured as an electric tool for cutting, grinding or drilling.

According to at least one embodiment, the electric tool is configured such that an at least partially manual feed by a user is provided in the operation of the electric tool.

According to a further aspect of the invention, a method for operating an electric tool system is specified, in particular for operating an electric tool system according to the invention, wherein the electric tool system comprises an electric tool and a lighting device arranged separately from the electric tool. According to the method, depending on a value of an operating parameter of the electric tool, information relating to the value of the operating parameter is directly or indirectly transmitted to the lighting device by means of the electric tool. In particular, a sensor signal is generated depending on the value of the operating parameter by means of the electric tool and the information is generated and transmitted depending on the sensor signal. By means of the lighting device, a plurality of light pulses is generated and emitted depending on the transmitted information, wherein a pulse parameter relating to a pulse duration of the plurality of light pulses and/or to a frequency of the plurality of light pulses and/or to a duty cycle of the plurality of light pulses depends on the value of the operating parameter and/or light is emitted by means of the lighting device, wherein a light intensity of the emitted light depends on the value of the operating parameter.

According to at least one embodiment of the method, the information relating to the value of the operating parameter or further information relating to the value of the operating parameter is directly or indirectly transmitted to a mobile electronic device. By means of the mobile electronic device, in particular by means of a haptic actuator of the mobile electronic device, a haptic output signal is output to a user depending on the transmitted information or the transmitted further information.

The mobile electronic device can for example be a mobile phone, a smartphone, a tablet computer, a laptop computer, a so-called wearable, a smart watch, a fitness wristband or the like.

In this manner, a haptic information channel is also used in addition to the visual information channel. Advantageously, the haptic information channel is not directly realized via the electric tool, but via the mobile electronic device, which the user for example directly wears on the body, such that the haptic output signal can be better distinguished from a vibration or movement of the electric tool by the user in processing the workpiece. Thus, the reliability and effectiveness of the information transmission can be further increased.

According to at least one embodiment of the method, the value of the operating parameter is compared to at least one predetermined limit value and the pulse parameter and/or the light intensity are determined depending on a result of the comparison.

According to at least one embodiment of the method, the at least one predetermined limit value of the method includes a first limit value, wherein the operating parameter is in a predetermined admissible operating range if, for example exactly if the value of the operating parameter is less than or equal to the first limit value. For determining the pulse parameter, a value for the frequency of the plurality of light pulses is selected from two or more predetermined frequency values depending on a result of the comparison. The selected value for the frequency of the plurality of light pulses is greater the lower a difference between the value of the operating parameter and the first limit value is if the operating parameter is in the admissible operating range.

According to at least one embodiment, the at least one predetermined limit value includes a second limit value, wherein the operating parameter is in a predetermined inadmissible operating range if the value of the operating parameter is greater than the second limit value. For determining the pulse parameter, a value for the frequency of the plurality of light pulses is selected from two or more predetermined frequency values depending on a result of the comparison. The selected value for the frequency of the plurality of light pulses is the greater the greater a difference between the value of the operating parameter and the second limit value is if the operating parameter is in the inadmissible operating range.

According to at least one embodiment of the method, the plurality of light pulses is generated and emitted such that a color of the emitted light pulses depends on the value of the operating parameter.

Thus, a proximity to the critical state can for example be even more clearly expressed and thus be even more immediately perceived by the user by corresponding modification of the color.

Further embodiments of the method according to the invention immediately follow from the different configurations of the control system according to the invention and of the electric tool system according to the invention and vice versa, respectively. In particular, individual features and corresponding explanations with respect to the different embodiments to the control system according to the invention and the electric tool system according to the invention can be analogously transferred to corresponding embodiments of the method according to the invention. In particular, the control system according to the invention or the electric tool system according to the invention is formed or programmed for performing a method according to the invention. In particular, the control system according to the invention or the electric tool system according to the invention performs the method according to the invention.

For example, the first control circuit can be configured as a first computing unit or be included by a first computing unit. The second control circuit can for example be configured as a second computing unit or be included by a second computing unit.

In particular, a data processing appliance can be understood by a computing unit, which contains a processing circuit. Thus, the computing unit can in particular process data for performing computing operations. Optionally, operations to perform indexed accesses to a data structure, for example a look-up table, LUT, also come within.

In particular, the computing unit can include one or more computers, one or more microcontrollers and/or one or more integrated circuits, for example one or more application-specific integrated circuits, ASIC, one or more field-programmable gate arrays, FPGA, and/or one or more systems on a chip, SoC. The computing unit can also include one or more processors, for example one or more microprocessors, one or more central processing units, CPU, one or more graphics processing units, GPU, and/or one or more signal processors, in particular one or more digital signal processors, DSP. The computing unit can also include a physical or a virtual compound of computers or others of the mentioned units.

In various embodiments, the computing unit includes one or more hardware and/or software interfaces and/or one or more memory units.

A memory unit can be configured as a volatile data memory, for example as a dynamic random access memory, DRAM, or static random access memory, SRAM, or as a non-volatile data memory, for example as a read-only memory, ROM, as a programmable read-only memory, PROM, as an erasable programmable read-only memory, EPROM, as an electrically erasable programmable read-only memory, EEPROM, as a flash memory or flash EEPROM, as a ferroelectric random access memory, FRAM, as a magnetoresistive random access memory, MRAM, or as phase-change random access memory, PCRAM.

Within the scope of the present disclosure, if there is talk of the fact that a component of the control system according to the invention or of the electric tool system according to the invention, in particular the first control circuit, the second first control circuit, the external computing unit or another computing unit of the control system or of the electric tool system, is configured, formed, adapted or the like to execute or realize a certain function, to achieve a certain effect or to serve for a certain purpose, thus, this can be understood such that the component, beyond the principal or theoretical usability or suitability of the component for this function, effect or purpose, is specifically and actually capable of executing or realizing the function, achieving the effect or serving for the purpose by corresponding adaptation, programming, physical configuration and so on.

Further features of the invention are apparent from the claims, the figures and the description of figures. The features and feature combinations mentioned above in the description as well as the features and feature combinations mentioned below in the description of figures and/or shown in the figures can be encompassed by the invention not only in the respectively specified combination, but also in other combinations. In particular, implementations and feature combinations can also be encompassed by the invention, which do not comprise all of the features of an originally formulated claim. Moreover, implementations and feature combinations can be encompassed by the invention, which extend beyond or deviate from the feature combinations set forth in the relations of the claims.

BRIEF DESCRIPTION OF THE FIGURES

In the following, the invention is explained in more detail based on specific embodiments and associated schematic drawings.

FIG. 1 depicts a schematic representation of an exemplary embodiment of an electric tool system according to the invention.

DETAILED DESCRIPTION

In the FIG. 1, an exemplary embodiment of an electric tool system 1 according to the invention is schematically shown, which comprises an electric tool 3, purely exemplarily represented as an angle grinder, and a lighting device 4 arranged separately from the electric tool 3, purely exemplarily represented as an LED lamp. The electric tool system 1 comprises an exemplary embodiment of a control system 2 according to the invention for the electric tool 3 and the lighting device 4, which is at least partially included by the electric tool 3 and the lighting device 4.

The lighting device 4 includes a light source 15 and for example a battery pack 6 with battery cells 12 to supply the light source 15 with electrical energy. For example, the electric tool 3 comprises an electric motor (not shown) and a battery pack 5 with battery cells 11 to supply the electric motor with electrical energy.

The control system 2 includes a first control circuit 7 of the electric tool 3, for example of the battery pack 5, and a second control circuit 8 of the lighting device 4, for example of the battery pack 6. The control system 2 comprises a sensor 13 of the electric tool 3, which is arranged and configured to determine or measure a value of an operating parameter of the electric tool 3 and to generate a sensor signal depending on the value of the operating parameter of the electric tool 3.

The sensor 13 can be arranged in the battery pack 5 or outside of the battery pack 5 in the electric tool 3. The sensor 13 can for example be configured as a current sensor and the operating parameter can correspond to a current from the battery pack 5 or the battery cells 11 to the electric motor. According to configuration of the electric tool 3, other operating parameters and corresponding sensors 13 are also possible.

The first control circuit 7 is configured to directly transmit information relating to the value of the operating parameter to the second control circuit 8 depending on the sensor signal, in particular via a first communication interface 9 of the electric tool 3, for example of the first control circuit 7, and a second communication interface 10 of the lighting device 4. Alternatively, the first control circuit 7 can transmit the information relating to the value of the operating parameter via the first communication interface 9 to an external computing unit 14, in particular a cloud server or the like, of the control system 2 depending on the sensor signal and the external computing unit 14 can transmit the information relating to the value of the operating parameter to the second communication interface 10 and thereby to the second control circuit 8.

The second control circuit 8 is configured to control the light source 15 of the lighting device 4 depending on the transmitted information to emit a plurality of light pulses. Therein, the light pulses are generated and emitted according to a pulse parameter, which relates to a pulse duration of the plurality of light pulses and/or to a frequency of the plurality of light pulses and/or to a duty cycle of the plurality of light pulses. Therein, the pulse parameter depends on the value of the operating parameter.

For example, the frequency of the plurality of light pulses can be gradually increased the closer the value of the operating parameter comes to a predetermined limit value, which for example defines a critical operating state.

LIST OF REFERENCE CHARACTERS

1 Electric tool system
2 control system
3 electric tool
4 lighting device
5, 6 battery pack
7, 8 control circuits
9, 10 communication interfaces
11, 12 battery cells
13 sensor
14 external computing unit
15 light source

What is claimed is:

1. A method for operating an electric tool system comprising an electric tool and a lighting device arranged separately from the electric tool, wherein depending on a value of an operating parameter of the electric tool, information relating to the value of the operating parameter is directly or indirectly transmitted to the lighting device by the electric tool; and wherein the lighting device provides, depending on the transmitted information,
   i) a plurality of light pulses to be emitted, wherein a pulse parameter relating to a pulse duration of the plurality of light pulses and/or to a frequency of the plurality of light pulses and/or to a pulse amplitude of the plurality of light pulses and/or to a duty cycle of the plurality of light pulses depends on the value of the operating parameter; or
   ii) a light pulse to be emitted, wherein a pulse parameter relating to a pulse duration and/or a pulse amplitude of the light pulse depends on the value of the operating parameter; or
   iii) light to be emitted, wherein a light intensity of the emitted light depends on the value of the operating parameter,
   wherein the value of the operating parameter is compared to at least one predetermined limit value and the pulse parameter and/or the light intensity are determined depending on a result of the comparison;
   wherein the at least one predetermined limit value includes a first limit value, wherein the operating parameter is in a predetermined admissible operating range if the value of the operating parameter is less than or equal to the first limit value; and for determining the pulse parameter depending on the result of the comparison, a value for the frequency of the plurality of light pulses is selected from two or more predetermined frequency values; and the selected value for the frequency of the plurality of light pulses is greater the lower a difference between the value of the operating parameter and the first limit value is, if the operating parameter is in the admissible operating range.

2. The method according to claim 1, wherein
the information relating to the value of the operating parameter or further information relating to the value of the operating parameter is directly or indirectly transmitted to a mobile electronic device; and by means of the mobile electronic device, a haptic output signal is output to a user depending on the transmitted information or the transmitted further information.

3. The method according to claim 1, wherein
the information is transmitted to the lighting device via a first communication interface of the electric tool and a second communication interface of the lighting device; or the information is transmitted to an external computing unit via the first communication interface of the electric tool and the information is transmitted from the external computing unit to the lighting device via the second communication interface of the lighting device.

4. The method according to claim 1, wherein
the information relating to the value of the operating parameter includes the value of the operating parameter.

5. The method according to claim 1, wherein
the information relating to the value of the operating parameter includes a result of the comparison.

6. The method according to claim 1, wherein
the information relating to the value of the operating parameter includes the pulse parameter and/or the light intensity; and a light source of the lighting device is controlled according to the pulse parameter and/or the light intensity.

7. The method according to claim 1, wherein
the lighting device is configured as a lighting device for room lighting or exterior lighting; and/or the electric tool is configured as an electric tool for cutting, grinding or drilling; and/or the electric tool is configured such that an at least partially manual feed by a user is provided in the operation of the electric tool.

8. A method for operating an electric tool system comprising an electric tool and a lighting device arranged separately from the electric tool, wherein depending on a value of an operating parameter of the electric tool, information relating to the value of the operating parameter is directly or indirectly transmitted to the lighting device by the electric tool; and wherein the lighting device provides, depending on the transmitted information, i) a plurality of light pulses to be emitted, wherein a pulse parameter relating to a pulse duration of the plurality of light pulses and/or to a frequency of the plurality of light pulses and/or to a pulse amplitude of the plurality of light pulses and/or to a duty cycle of the plurality of light pulses depends on the value of the operating parameter; or ii) a light pulse to be emitted, wherein a pulse parameter relating to a pulse duration and/or a pulse amplitude of the light pulse depends on the value of the operating parameter; or iii) light to be emitted, wherein a light intensity of the emitted light depends on the value of the operating parameter;

wherein the value of the operating parameter is compared to at least one predetermined limit value and the pulse parameter and/or the light intensity are determined depending on a result of the comparison;

wherein the at least one predetermined limit value includes a second limit value, wherein the operating parameter is in a predetermined inadmissible operating range if the value of the operating parameter is greater than the second limit value;

for determining the pulse parameter depending on the result of the comparison, a value for the frequency of the plurality of light pulses is selected from two or more predetermined frequency values; and the selected value for the frequency of the plurality of light pulses is greater the greater a difference between the value of the operating parameter and the second limit value is, if the operating parameter is in the inadmissible operating range.

9. The method according to claim 8, wherein
the information relating to the value of the operating parameter or further information relating to the value of the operating parameter is directly or indirectly transmitted to a mobile electronic device; and by means of the mobile electronic device, a haptic output signal is output to a user depending on the transmitted information or the transmitted further information.

10. The method according to claim 8, wherein
the information is transmitted to the lighting device via a first communication interface of the electric tool and a second communication interface of the lighting device; or the information is transmitted to an external computing unit via the first communication interface of the electric tool and the information is transmitted from the external computing unit to the lighting device via the second communication interface of the lighting device.

11. The method according to claim 8, wherein
the information relating to the value of the operating parameter includes the value of the operating parameter.

12. The method according to claim 8, wherein
the information relating to the value of the operating parameter includes a result of the comparison.

13. The method according to claim 8, wherein
the information relating to the value of the operating parameter includes the pulse parameter and/or the light intensity; and a light source of the lighting device is controlled according to the pulse parameter and/or the light intensity.

14. The method according to claim 8, wherein
the lighting device is configured as a lighting device for room lighting or exterior lighting; and/or the electric tool is configured as an electric tool for cutting, grinding or drilling; and/or the electric tool is configured such that an at least partially manual feed by a user is provided in the operation of the electric tool.

* * * * *